United States Patent [19]

Remke

[11] 4,250,664
[45] Feb. 17, 1981

[54] WIRE BASKET

[76] Inventor: Adam R. Remke, 5636 W. Goodman St., Chicago, Ill. 60630

[21] Appl. No.: 59,289

[22] Filed: Jul. 20, 1979

[51] Int. Cl.³ .............................................. A01H 11/00
[52] U.S. Cl. ........................................... 47/76; 47/78; 206/423; 220/19
[58] Field of Search .......................... 47/73, 77, 78, 76; 206/423; 220/19; D9/247, 248; D11/148, 152, 143; D8/1; D7/189

[56] References Cited

U.S. PATENT DOCUMENTS

| 738,301 | 9/1903 | Dowd | 82/2 R |
|---|---|---|---|
| 2,152,456 | 3/1939 | Barrie | 220/19 |
| 3,481,075 | 12/1969 | Dastoli et al. | 47/41 |
| 3,550,318 | 12/1970 | Remke et al. | 47/37 |
| 3,550,662 | 12/1970 | Remke et al. | 150/11 |
| 4,062,148 | 12/1977 | Edmonds et al. | 47/78 |

FOREIGN PATENT DOCUMENTS

| 115209 | 10/1945 | Sweden | 220/19 |
|---|---|---|---|
| 113390 | 3/1918 | United Kingdom | 220/19 |
| 336735 | 2/1932 | United Kingdom | 47/78 |
| 873693 | 7/1961 | United Kingdom | 220/19 |
| 1187620 | 4/1970 | United Kingdom | 47/78 |

Primary Examiner—James R. Feyrer
Attorney, Agent, or Firm—Hill, Van Santen, Steadman, Chiara & Simpson

[57] ABSTRACT

Wire baskets to receive burlap bag wrapped root balls of trees and bushes have a large diameter top wire ring, a smaller diameter bottom wire ring, at least one intermediate wire ring and a plurality of U-shaped brace wires enveloping said rings in circumferentially spaced relation having the ends of the side legs thereof looped over the top and inner periphery of the top ring and the bight portions thereof underlying the bottom ring and spanning the bottom ring area in overlapped relation at a plurality of zones spaced from the center of the ring area to form a reinforced bottom. The brace wires surround and retain the rings and the intermediate and bottom rings are spot welded to the surrounding brace wires. The wire baskets house the root balls during storage prior to transplanting, during transportation to the planting site and are buried with the root balls at the planting site thereby preventing loosening of the earth surrounding the roots in the burlap bag wrapped ball.

6 Claims, 9 Drawing Figures

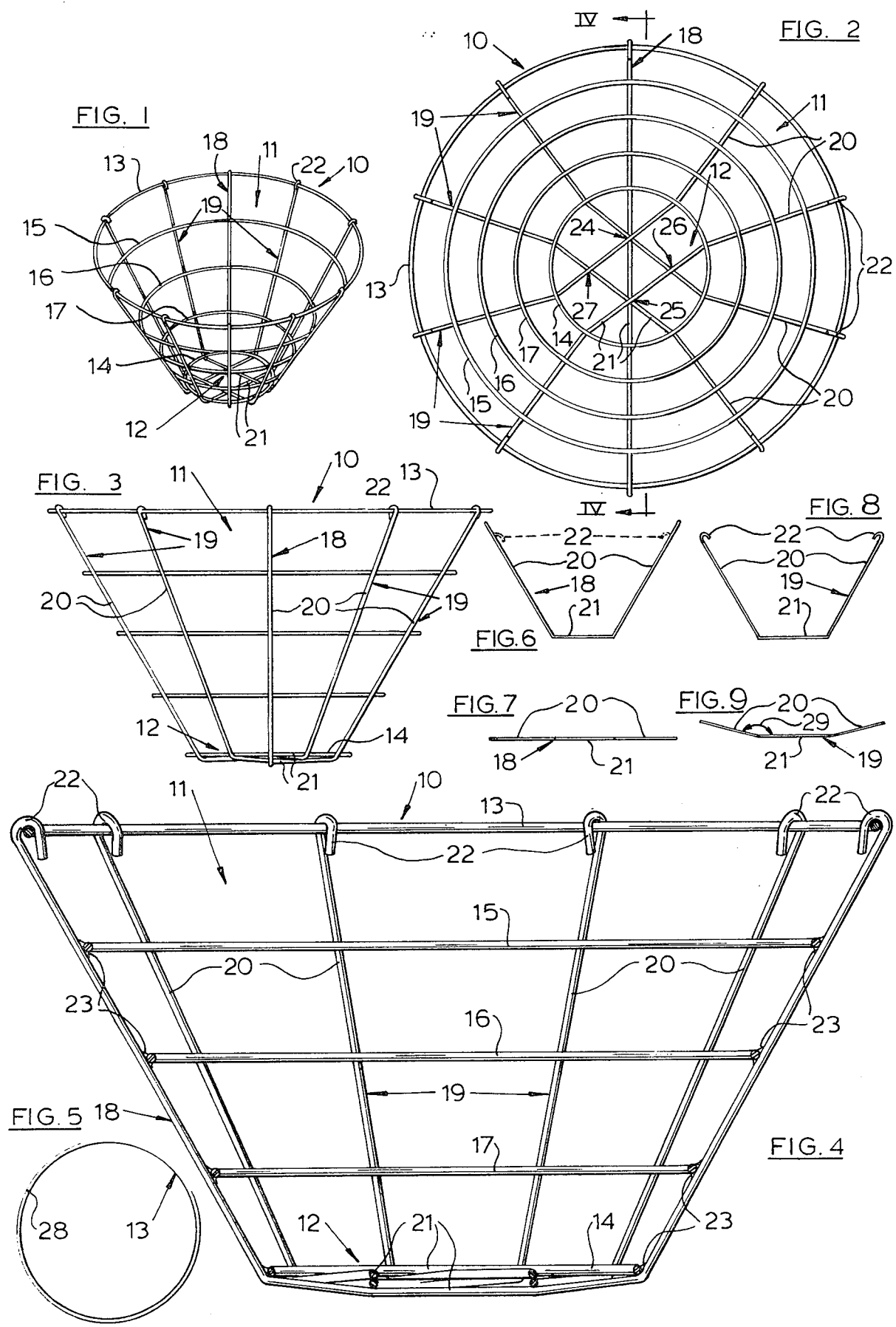

WIRE BASKET

FIELD OF THE INVENTION

This invention relates to the art of wire baskets especially useful in the nursery business to house and protect burlap bag wrapped root balls of trees and bushes during storage, transportation, and planting and particularly deals with a frusto-conical open lattice basket having axially spaced top, bottom and intermediate wire rings surrounded by a plurality of U-shaped brace wires in circumferentially spaced relation each having bottom portions spanning the area of the bottom ring and overlapped at a plurality of points spaced from the center of the ring to provide a reinforced bottom.

Prior Art

Burlap bags for wrapping earth surrounding the roots of trees, bushes and the like to form "root balls" are known, for example in the Adam Robert Remke and Anna Remke U.S. Pat. Nos. 3,550,318 and 3,550,662 issued Dec. 29, 1970. In order to maintain the integrity of the earth embedding the roots of the tree or plant these bags have to be strong, firmly stitched and tightly wrapped around the root ball. Nonetheless, they are subject to tearing, bursting, rotting, and deformation permitting loss of the earth and exposure of the roots. It would be an improvement in the art to house such burlap bag wrapped root balls in strong, rigid baskets snugly receiving the burlap bag wrapped ball without in any way interfering with root growth so that the tree or plant could be stored for a long time, transported to a planting site, and planted intact thereby avoiding a loss of the root protecting earth even though the burlap became sufficiently degraded so as to be unable to retain the ball. The container of course should be sufficiently open so as not to interfere with root growth.

SUMMARY OF THE INVENTION

According to this invention, strong, open lattice wire baskets are provided to facilitate the handling of potted plants such as burlap bag wrapped root balls to encourage nursery growth prior to transplanting, to protect against disruption of earth surrounding the roots during transportation to a planting site and to accommodate unobstructed root growth when buried with the root ball at the planting site.

The invention provides frusto-conical wire baskets of any desired size, composed of a plurality of spaced superimposed wire rings surrounded by circumferentially spaced U-shaped wire braces or "radial" wires. The upper ends of the side legs of the braces are looped over the top wire ring forming smooth J-shaped top ends crimping the top wire ring in place and affording smooth entrance guides to the interior of the basket. The bottom wire ring has the bottoms or bight portions of the U-shaped brace or radical wires bent thereunder to span the area circumscribed by this bottom wire ring. The bottom portions of the wires have cross over points spaced from the center of the bottom ring to form a lattice arrangement of great rigidity to support the heavy loads without bending.

Since all of the rings are embraced by the brace or radial wires and since the side legs of these brace wires converge from a large top ring to a small bottom ring, the wire rings will wedge into position in the basket at spaced levels determined by their diameters. The bottom intermediate rings are spot welded to the brace wires at their cross over points.

A preferred basket will have five circular wire rings, one radially straight brace wire and four brace wires with side legs bent out of the plane of the bottom bight portion so that the bight portions of these brace wires will cross over at 12, 3, 6, and 9 o'clock positions in the bottom of the basket.

The wires forming the circular rings and the brace wires or "radials" will preferably be of 5 to 8 gauge with diameters of 3/16 to ¼ inch. Mild steel such as SAE 1010 is suitable wire material and may be painted to resist premature rusting although degradation after burying is desirable.

For handling the root balls of trees and large bushes, the baskets will vary in size from bottom diameters of 12 to 20 inches, heights of from 14 to 30 inches and top diameters of from 24 to 60 inches. The following specific sizes within these ranges are very useful in the nursery business:

| Bottom Diameter Inches | Height Inches | Top Diameter Inches |
|---|---|---|
| 12 | 14 | 24 |
| 12 | 16 | 28 |
| 19 | 22 | 36 |
| 20 | 24 | 40 |
| 20 | 30 | 60 |

Baskets of the above sizes when formed from five circular rings and five brace wires will provide a wide open lattice structure accommodating free growth of roots but it should of course be understood that the number of rings and brace wires can be varied as desired.

An important feature of the invention is the arrangement of the brace or radial wires to form a reinforced open lattice basket bottom with the cross over points spaced outwardly from the center to maintain a flat plane for the bottom of the basket even under heavy loads.

It is then an object of this invention to provide open lattice wire baskets especially adapted for receiving burlap bag root balls of large plants such as trees and bushes.

Another object of the invention is to provide a frusto-conical open lattice wire basket from rings and U-shaped brace wires enveloping the rings and forming an open lattice bottom for the basket.

A specific object of the invention is to provide a wire basket for nurseries to house burlap bag wrapped root balls of plants protecting the burlap bag and earth embedding the roots against disruption even when roughly handled in storage in a nursey, during transportation to a planting site and during burying into the ground with the root ball.

Another specific object of the invention is to provide a wire basket for nurseries having a large diameter top ring, a small diameter bottom ring, a plurality of axially spaced intermediate rings, and a plurality of circumferentially spaced wire braces enveloping the rings to form side struts and a bottom for the basket with the portions forming the bottom being crossed over at zones spaced from the center and with the top portions of the struts bent over the top wire ring clamping the ring in position and forming smooth entrance guides to the basket.

Other and further objects and features of this invention will become apparent to those skilled in this art from the following detailed description of the annexed sheet of drawings which shows a preferred embodiment of the invention.

ON THE DRAWINGS

FIG. 1 is a bottom and side perspective view of a wire basket according to this invention;

FIG. 2 is a top plan view of the basket of FIG. 1;

FIG. 3 is a side elevational view of the basket of FIG. 1;

FIG. 4 is a vertical cross sectional view of the basket taken along the line IV-IV of FIG. 2;

FIG. 5 is a plan view of a ring component for the basket;

FIG. 6 is a side view of one of the brace or radial wires of the basket;

FIG. 7 is a plan view of the wire of FIG. 6;

FIG. 8 is a side view of the bent brace or radial wires of the basket; and

FIG. 9 is a plan view of the wire of FIG. 8.

AS SHOWN ON THE DRAWINGS

The basket 10 of FIGS. 1 to 4 is illustrated as frustoconical in shape with a large open entrance mouth or top 11 and a small flat bottom 12.

The basket 10 has a large diameter circular top wire ring 13, a small diameter circular bottom wire ring 14 and three axially spaced superimposed intermediate rings 15, 16 and 17. These wire rings are embraced by a flat U-shaped brace or radial wire 18 and four bent U-shaped brace wires or radials 19 disposed circumferentially around the rings in equally spaced relation. Each brace or radial wire 18 and 19 is U-shaped with side legs or strut portions 20 surrounding the wire rings, and with relatively flat bight portions or bottoms 21 bent under the bottom ring 14 which span the area circumscribed by this bottom ring 14. The tops of the side legs 20 are crimped over the top wire ring 13 providing J-shaped loops 22 clamping the ring in position and forming smooth guides to the wide open mouth or entrance 11 of the basket.

The bottom ring 14 and the intermediate rings 15, 16 and 17 are spot welded to the brace wires 18 and 19 at their cross over points to form weld bonds 23 fixedly uniting the rings and braces.

Since the rings are snugly embraced by the converging side legs or strut portions 20, they will be wedged in position at their axially spaced levels even though the weld bonds fracture.

As best shown in FIG. 2 the flat brace or radial wire 18 spans the diameter of the basket in a single plane and its bight portion 21 also spans the diameter of the area circumscribed by the bottom ring 14. However the other brace wires or radials 19 have their bight portion 21 offset from their strut portions or side legs 20 at angles which will cause the bight portions to cross over each other at points which are spaced radially outward from the center of the bottom ring 14.

The flat brace or radial wire 18 has its bight portion 21 underlying the bight portions of the other brace or radial wires 19. The angle of the offset strut and radial portions 20 and 21 of the wires 19 are such that the bight portions 21 will cross over each other in the bottom of the basket at points spaced radially outward from the center of the bottom and preferably about midway between this center and the bottom ring 14 with the flat wire 18 also underlying two of the cross over points. Thus three brace wire cross overs occur at the 12 and 6 o'clock positions 24 and 25 while two wire cross overs occur at the 3 and 9 o'clock positions 26 and 27 as viewed in FIG. 2. This arrangement provides a reinforced substantially flat bottom 12 for the basket which will not deflect out of its flat plane even when heavily loaded.

As illustrated in FIG. 5 each wire ring such as the ring 13 is circular with the wire having abutted ends welded together at 28. It is preferred that the weld bonds 28 be spaced circumferentially from the bonds 23 uniting the strut portions of the brace wires with the rings.

As shown in FIGS. 6 and 7 the so-called flat U-shaped brace wire 18 has its bight portion 21 in the same plane as the side legs 20 and the upper ends of the side legs 20 are bent as shown in dotted lines to form the J-shaped ends 22.

As shown in FIGS. 8 and 9 each component brace or radial wire 19 has its bight portion 21 offset from its side legs 20 at an obtuse angle 29 so that the strut portions 20 lie in a different plane than the bight portion to position the bight portion outwardly from the center of the bottom ring 14. The cross overs of the bight portions of the wires are thus positioned to form an open lattice bottom of substantial rigidity.

As shown in FIG. 4 the bight portions 21 of the brace or radial wires 19 overlie the bottom bight portion of the brace wire 18 and are somewhat pushed up to cross over each other as illustrated.

While the preferred embodiment illustrated in the drawings shows circular rings 14–17 it will of course be understood that rings of any configuration could be used. It will also be understood that the number of rings and the number of brace or radial wires can be varied as desired. The open lattices provided by the illustrated arrangement of five rings and five brace wires is highly desirable to accommodate free root growth and yet afford sufficient rigidity to retain the root ball.

From the above descriptions it will therefore be understood that this invention provides a wire basket especially useful in the nursery business to contain burlap bag wrapped root balls of large plants without interfering with root growth. The baskets are composed of rings and U-shaped brace wires arranged to provide a reinforced bottom and rigid struts or sides holding the rings in axially spaced relation.

I claim as my invention:

1. A wire basket which comprises a plurality of axially spaced wire rings including a top ring and a bottom ring, a plurality of circumferentially spaced U-shaped brace wires surrounding said wire rings providing upstanding strut portions holding the rings in axially spaced relation and bight portions forming a basket bottom, one of said brace wires having the strut and bight portions lying in a substantially vertical plane on the axis of the basket, other of said brace wires having strut and bight portions angularly offset relative to said axis, and the bight portions of the brace wires crossing at points radially spaced from the center of the bottom ring of the basket forming a pair of three wire cross overs in overlapped contact on a line on said plane on said axis of the basket and a pair of additional wire cross overs in overlapped contact intermediate the pair of three wire cross overs on opposite sides of said axis.

2. The basket of claim 1 wherein all of the wire cross overs lie about midway between the center and periphery of the bottom ring.

3. A frusto-conical open lattice wire basket adapted for housing burlap bag wrapped root balls of large plants which comprises a plurality of circumferential wire rings in axially spaced relation and including a top ring and a bottom ring; a plurality of circumferentially spaced U-shaped brace wires secured to said rings and having bight portions overlapped in engagement at points radially spaced from the center of the bottom ring, one of said brace wires lying in a substantially vertical plane on the axis of the basket with its bight portion underlying the bight portions of the other brace wires, and the circumferential spacing of the brace wires being such as to provide a pair of three wire cross overs in spaced relation from the center of the bottom ring on a line on said plane on said axis of the basket and a pair of two wire cross overs spaced from the center of the bottom ring and lying intermediate the three wire cross overs.

4. The basket of claim 3 composed of five rings equally spaced from one to the next and five brace wires equally spaced from one to the next around said rings.

5. An open lattice wire basket adapted for housing burlap bag wrapped root balls of trees which comprises a plurality of axially spaced wire rings including a top ring and a bottom ring, a plurality of circumferentially spaced U-shaped brace wires surrounding said wire rings providing upstanding strut portions holding the rings in axially spaced relation and flat bight portions forming a basket bottom, one of said brace wires having the strut and bight portions lying in a substantially vertical plane on the axis of the basket, the other of said brace wires having the strut and bight portions angularly offset relative to said axis, and the bight portions of the brace wires crossing at points radially spaced from the center of the bottom ring of the basket forming three wire cross overs at the 12 and 6 o'clock positions of the basket bottom and two wire cross overs at the 3 and 9 o'clock positions of the basket bottom.

6. The basket of claim 3 wherein the cross overs are about midway between the center and periphery of the bottom ring.

* * * * *